United States Patent
Kim et al.

(10) Patent No.: US 8,780,164 B2
(45) Date of Patent: Jul. 15, 2014

(54) METHOD AND APPARATUS FOR SHARING MOBILE BROADCAST SERVICE

(75) Inventors: Sun-Mi Kim, Seoul (KR); Jin-Woo Jeon, Seongnam-si (KR); Young-Jip Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 864 days.

(21) Appl. No.: 12/657,088

(22) Filed: Jan. 12, 2010

(65) Prior Publication Data

US 2010/0177156 A1     Jul. 15, 2010

(30) Foreign Application Priority Data

Jan. 13, 2009    (KR) .................. 10-2009-0002574

(51) Int. Cl.
*H04N 7/14* (2006.01)
*H04L 12/00* (2006.01)

(52) U.S. Cl.
USPC .............. 348/14.02; 348/14.01; 348/14.07; 348/445; 370/230; 370/311; 370/331; 370/493; 370/537; 375/240.2; 386/214; 386/299; 455/3.01; 455/69; 455/127.4; 455/414.1; 455/525; 463/42; 709/227; 715/758; 725/47; 725/68; 725/99; 725/105; 725/152

(58) Field of Classification Search
CPC ..................................................... H04N 7/173
USPC .................. 348/14.02, 14.01, 14.07, 445, 15; 370/230, 252, 311, 312, 328, 329, 352, 370/432, 326, 332, 337, 354, 493, 537; 386/291, 214, 299; 455/3.01, 3.02, 455/3.06, 69, 414.1, 436, 452.1, 515, 519, 455/525, 466, 127.4, 416, 432.3, 450, 518, 455/426, 432; 725/1, 68, 105, 47, 62, 99, 725/152; 375/240.2; 463/42; 715/758; 709/227

See application file for complete search history.

(56) References Cited

U.S. PATENT DOCUMENTS

| | | | | |
|---|---|---|---|---|
| 5,764,297 A * | 6/1998 | Sengoku | ...................... | 348/445 |
| 5,850,250 A * | 12/1998 | Konopka et al. | ........... | 348/14.07 |
| 6,112,084 A * | 8/2000 | Sicher et al. | ................. | 370/337 |
| 6,412,112 B1 * | 6/2002 | Barrett et al. | ................. | 725/152 |
| 6,473,442 B1 * | 10/2002 | Lundsjo et al. | ............... | 370/537 |
| 6,775,255 B1 * | 8/2004 | Roy | .............................. | 370/331 |
| 7,031,678 B2 * | 4/2006 | Ballantyne | ................. | 455/127.4 |
| 7,346,363 B2 * | 3/2008 | Lee et al. | ...................... | 455/515 |
| 7,349,711 B2 * | 3/2008 | Hu et al. | ....................... | 455/519 |
| 7,406,063 B2 * | 7/2008 | Jung et al. | .................... | 370/329 |
| 7,483,415 B2 * | 1/2009 | Yeom | ............................ | 370/352 |
| 7,483,418 B2 * | 1/2009 | Maurer | ......................... | 370/354 |
| 7,509,091 B2 * | 3/2009 | Ito | ................................ | 455/3.06 |
| 7,554,940 B2 * | 6/2009 | Kawaguchi et al. | .......... | 370/328 |
| 7,555,289 B2 * | 6/2009 | Kim | ............................ | 455/414.1 |
| 7,583,929 B2 * | 9/2009 | Choi et al. | ................... | 455/3.01 |
| 7,659,919 B2 * | 2/2010 | Bowen et al. | ............... | 348/14.02 |
| 7,764,645 B2 * | 7/2010 | Yi et al. | ....................... | 370/328 |

(Continued)

*Primary Examiner* — Gerald Gauthier (57) ABSTRACT

Two different communication terminals share a broadcast content received through a mobile broadcast service. If a mobile broadcast-sharing mode for sharing a broadcast content with a specific communication terminal is set, a mobile broadcast terminal extracts broadcast video data and broadcast audio data from a mobile broadcast signal being received. The mobile broadcast terminal converts a codec of the broadcast video data and the broadcast audio data into a codec used in video communication, and delivers at least one of the converted broadcast video data and the converted broadcast audio data through video communication formed to the communication terminal.

23 Claims, 5 Drawing Sheets

(56) References Cited

U.S. PATENT DOCUMENTS

| | | | |
|---|---|---|---|
| 7,796,557 B2 * | 9/2010 | Xue et al. | 370/332 |
| 7,864,722 B2 * | 1/2011 | Yi et al. | 370/312 |
| 7,865,135 B2 * | 1/2011 | Park | 455/3.02 |
| 7,869,401 B2 * | 1/2011 | Dang et al. | 370/329 |
| 7,876,997 B2 * | 1/2011 | Yabuta | 386/291 |
| 7,894,338 B2 * | 2/2011 | Ljung et al. | 370/230 |
| 7,907,558 B2 * | 3/2011 | Shahid et al. | 370/312 |
| 7,924,760 B2 * | 4/2011 | Ding et al. | 370/312 |
| 7,945,931 B2 * | 5/2011 | Paik et al. | 725/62 |
| 7,970,002 B2 * | 6/2011 | Hu | 370/432 |
| 7,995,510 B2 * | 8/2011 | Gao | 370/312 |
| 8,010,119 B2 * | 8/2011 | Benco et al. | 455/450 |
| 8,019,273 B2 * | 9/2011 | Choi et al. | 455/3.01 |
| 8,036,693 B1 * | 10/2011 | El-Fishawy | 455/518 |
| 8,111,628 B2 * | 2/2012 | Yin | 370/252 |
| 8,121,632 B2 * | 2/2012 | Sambhwani et al. | 455/525 |
| 8,125,507 B2 * | 2/2012 | Ryu et al. | 348/14.02 |
| 8,184,570 B2 * | 5/2012 | Chun et al. | 370/312 |
| 8,229,345 B2 * | 7/2012 | Yoo | 455/3.01 |
| 8,254,299 B2 * | 8/2012 | Kim | 370/312 |
| 8,346,941 B2 * | 1/2013 | Hinrichs et al. | 709/227 |
| 8,555,179 B2 * | 10/2013 | Lee et al. | 348/14.03 |
| 2003/0078061 A1 * | 4/2003 | Kim | 455/466 |
| 2003/0084451 A1 * | 5/2003 | Pierzga et al. | 725/47 |
| 2003/0119452 A1 * | 6/2003 | Kim et al. | 455/69 |
| 2004/0090992 A1 * | 5/2004 | Lee | 370/493 |
| 2004/0219914 A1 * | 11/2004 | Patel | 455/432.3 |
| 2005/0047398 A1 * | 3/2005 | Yeom | 370/352 |
| 2005/0200694 A1 * | 9/2005 | Kim | 348/14.01 |
| 2005/0265445 A1 * | 12/2005 | Xin et al. | 375/240.2 |
| 2006/0166686 A1 * | 7/2006 | Kim | 455/466 |
| 2007/0003217 A1 * | 1/2007 | Jang | 386/83 |
| 2007/0058576 A1 * | 3/2007 | Kwon et al. | 370/326 |
| 2007/0067815 A1 * | 3/2007 | Bowen et al. | 725/99 |
| 2007/0093238 A1 * | 4/2007 | Lin | 455/416 |
| 2007/0099704 A1 * | 5/2007 | Liu et al. | 463/42 |
| 2007/0143799 A1 * | 6/2007 | Bloebaum | 725/62 |
| 2007/0174885 A1 * | 7/2007 | Hus et al. | 725/105 |
| 2008/0003985 A1 * | 1/2008 | Jung et al. | 455/414.1 |
| 2008/0072263 A1 * | 3/2008 | Kim | 725/62 |
| 2008/0081634 A1 * | 4/2008 | Kaikkonen et al. | 455/452.1 |
| 2008/0084871 A1 * | 4/2008 | Wang et al. | 370/352 |
| 2008/0216128 A1 * | 9/2008 | Park | 725/68 |
| 2008/0248821 A1 * | 10/2008 | Kim | 455/466 |
| 2008/0267104 A1 * | 10/2008 | Zhang | 370/311 |
| 2009/0047957 A1 * | 2/2009 | Westerberg | 455/436 |
| 2009/0116417 A1 * | 5/2009 | Hu | 370/312 |
| 2009/0219849 A1 * | 9/2009 | Alpert et al. | 370/312 |
| 2009/0225693 A1 * | 9/2009 | Yi et al. | 370/312 |
| 2009/0232129 A1 * | 9/2009 | Wong et al. | 370/352 |
| 2010/0103855 A1 * | 4/2010 | Wang et al. | 370/312 |
| 2010/0110960 A1 * | 5/2010 | Kim et al. | 370/312 |
| 2010/0165901 A1 * | 7/2010 | Kim | 370/312 |
| 2010/0177156 A1 * | 7/2010 | Kim et al. | 348/14.02 |
| 2010/0208641 A1 * | 8/2010 | Guo | 370/312 |
| 2011/0032861 A1 * | 2/2011 | Gou | 370/312 |
| 2011/0197233 A1 * | 8/2011 | Paik et al. | 725/62 |
| 2011/0283303 A1 * | 11/2011 | Jung et al. | 725/1 |
| 2012/0076065 A1 * | 3/2012 | Dang | 370/312 |

* cited by examiner

FIG.5D

METHOD AND APPARATUS FOR SHARING MOBILE BROADCAST SERVICE

CROSS-REFERENCE TO RELATED APPLICATION(S) AND CLAIM OF PRIORITY

The present application is related to and claims the benefit under 35 U.S.C. §119(a) of a Korean Patent Application filed in the Korean Intellectual Property Office on Jan. 13, 2009 and assigned Serial No. 10-2009-0002574, the entire disclosure of which is hereby incorporated by reference.

TECHNICAL FIELD OF THE INVENTION

The present invention relates generally to a mobile broadcast service, and more particularly, to a method and apparatus for sharing mobile broadcast contents.

BACKGROUND OF THE INVENTION

Along with the recent boom in third-generation mobile communication, mobile terminals for video calls have been widely spread. The third-generation mobile communications technology may not only perform video calls, but also transmit a large amount of multimedia at high speed and easily support an automatic global roaming service. Hence, this communication technology is expected to be widely used as the next-generation mobile communication.

Many standards proposed for mobile broadcast services based on mobile terminals include Digital Multimedia Broadcasting (DMB), Digital Video Broadcasting-Handheld (DVB-H), Digital Video Broadcasting-Convergence of Broadcast and Mobile Services (DVB-CBMS), and Open Mobile Alliance Mobile Broadcast Services Enabler Suite (OMA-BCAST), and the mobile broadcast services based on these standards are now available. In some countries including South Korea, DMB broadcast service over mobile terminals has now been commonplace, and many new services based on broadcasting-communication convergence have been proposed in succession.

As to the current situation regarding mobile broadcast services, since a mobile broadcast service is performed with a different standard in every area and every broadcast service provider supports a different mobile broadcast standard, terminals supporting mobile broadcast also support only predetermined standards.

Therefore, if a user, or a broadcast/communication subscriber, leaves a particular area with his/her mobile terminal, the user may enjoy only the limited broadcast services and may not receive a roaming service for mobile broadcast.

SUMMARY OF THE INVENTION

To address the above-discussed deficiencies of the prior art, it is a primary object to provide a method and apparatus capable of sharing mobile broadcast contents with the other party using the common video call service based on mobile communication.

Another aspect of the present invention provides a method and apparatus for allowing a user of a mobile broadcast terminal to access a broadcast roaming service in an area where a specific standard is insupportable.

In accordance with one aspect of the present invention, there is provided a method for sharing a mobile broadcast service in a mobile broadcast terminal, in which if a mobile broadcast-sharing mode for sharing a broadcast content with a specific communication terminal is set, broadcast video data and broadcast audio data are extracted from a mobile broadcast signal being received, a codec of the broadcast video data and the broadcast audio data is converted into a codec used in video communication, and at least one of the converted broadcast video data and the converted broadcast audio data is delivered through video communication formed to the communication terminal.

In accordance with another aspect of the present invention, there is provided an apparatus for sharing a mobile broadcast service in a mobile broadcast terminal, in which a mobile broadcast processor extracts broadcast video data and broadcast audio data from a mobile broadcast signal received through a mobile broadcast receiver, if a mobile broadcast-sharing mode for sharing a broadcast content with a specific communication terminal is set, a codec converter converts a codec of the broadcast video data and the broadcast audio data received from the mobile broadcast processor into a codec used in video communication, and a communication module delivers at least one of the converted broadcast video data and the converted broadcast audio data received from the codec converter through video communication formed to the communication terminal.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean, to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality-associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, the same drawing reference numerals will be understood to refer to the same elements, features and structures.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

The present invention is directed to enabling two different communication terminals to share broadcast contents received through a mobile broadcast service. In accordance with the present invention, if a mobile broadcast-sharing mode for sharing a broadcast content with a specific communication terminal is set, a mobile broadcast terminal extracts broadcast video data and broadcast audio data from a mobile broadcast signal being received. The mobile broadcast terminal converts a codec of the broadcast video data and the broadcast audio data into a codec used in video communication, and delivers at least one of the converted broadcast video data and the converted broadcast audio data through video communication formed to the specific communication terminal.

The at least one data may be delivered to the specific communication terminal along with at least one of call video data and call audio data generated for the video communication. The at least one of the converted broadcast video data and the converted broadcast audio data may be played simultaneously along with the at least one of the call video data and the call audio data, and provided to a user.

The data to be delivered to the specific communication terminal may be selected by the user from the converted broadcast video data, the converted broadcast audio data, the call video data and the call audio data.

Figure 1:
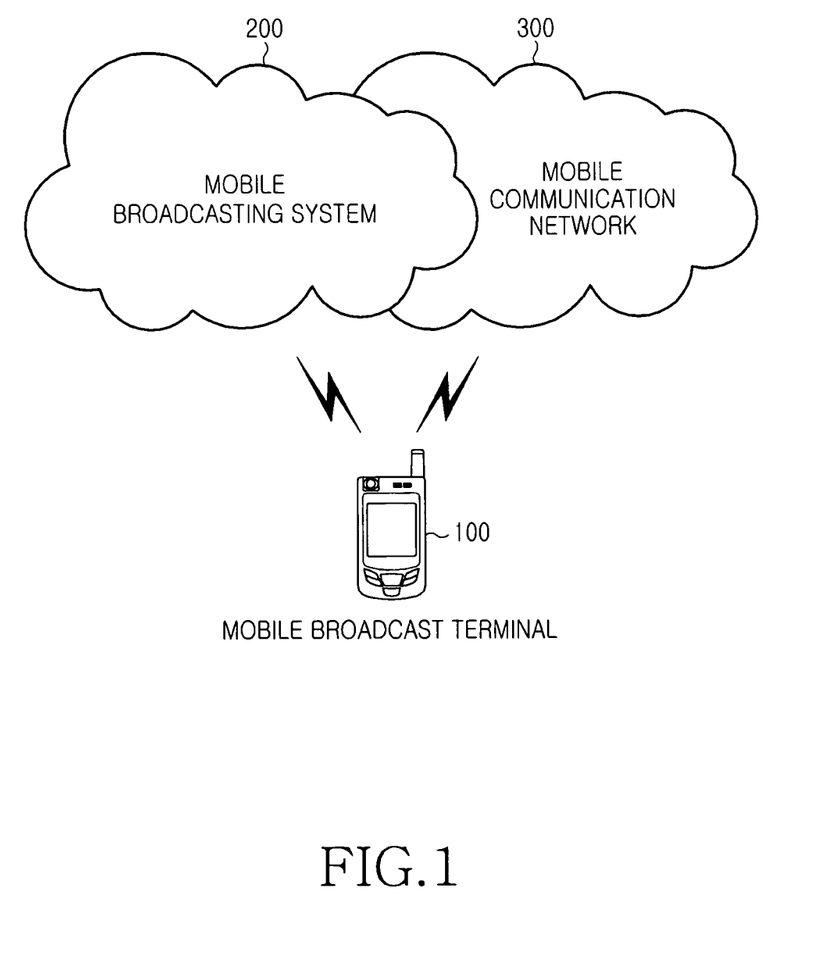
FIG. 1 illustrates a configuration of a communication system according to an embodiment of the present invention.

A configuration of a communication system to which the present invention is applied will be described with reference to FIG. 1. The communication system includes a mobile broadcasting system 200, a mobile communication network 300, and a mobile broadcast terminal 100.

The mobile broadcasting system 200 converts contents provided from a mobile broadcast content provider into a form available for mobile broadcast, and broadcasts the converted contents to the mobile broadcast terminal 100. The mobile broadcasting system 200 may also broadcast Electronic Program Guide (EPG) data consisting of information about mobile broadcast programs to be delivered, to the mobile broadcast terminal 100.

The mobile communication network 300 interworks with the mobile broadcasting system 200, and provides mobile broadcast services to the mobile broadcast terminal 100.

The mobile broadcast terminal 100 receives mobile broadcast provided from the mobile broadcasting system 200, and accesses the mobile communication network 300 to perform mobile communication.

Figure 2:
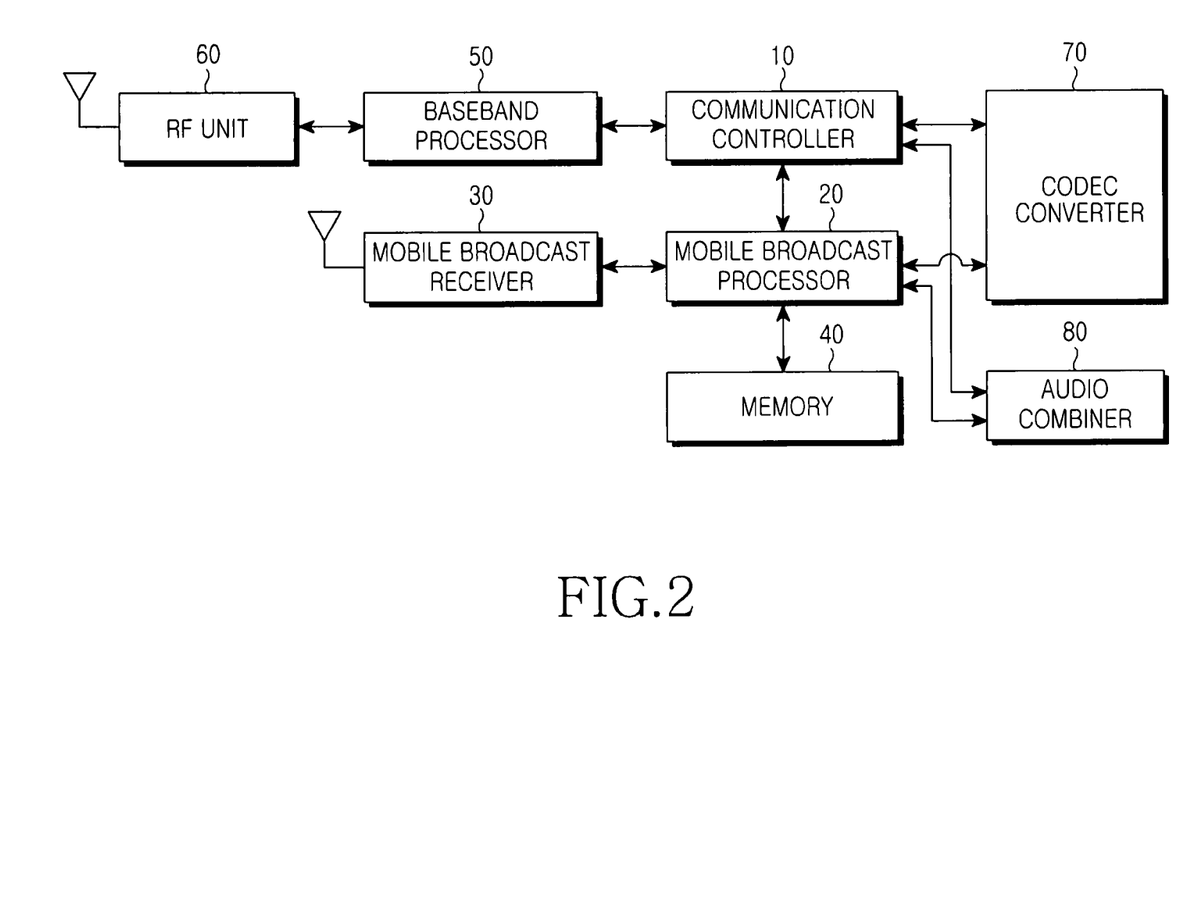
FIG. 2 illustrates a structure of a mobile broadcast terminal according to an embodiment of the present invention.

A structure of the mobile broadcast terminal 100 according to an embodiment of the present invention is shown in FIG. 2. The mobile broadcast terminal 100 includes a communication controller 10, a mobile broadcast processor 20, a mobile broadcast receiver 30, a memory 40, a baseband processor 50, a Radio Frequency (RF) unit 60, a codec converter 70, and an audio combiner 80. Here, the communication controller 10, the baseband processor 50, and the RF unit 60 constitute a communication module.

The mobile broadcast receiver 30, under the control of the mobile broadcast processor 20, receives a mobile broadcast signal and delivers the received mobile broadcast signal to the mobile broadcast processor 20.

The RF unit 60 is adapted to exchange radio signals with a base station for mobile communication via an antenna. The RF unit 60 modulates a transmission signal received from the communication controller 10 through the baseband processor 50 into a radio signal, transmits the radio signal via the antenna, demodulates a radio signal received via the antenna, and provides the demodulated signal to the communication controller 10 through the baseband processor 50.

The baseband processor 50 processes baseband signals exchanged between the RF unit 60 and the communication controller 10.

An audio processor (not shown), which is connected to a plurality of audio output means and a microphone, outputs audio data received from the microphone to the communication controller 10, and outputs audio data received from the communication controller 10 and the mobile broadcast processor 20 to the plurality of audio output means. The multiple audio output means, which are end means for outputting audio data, may include a speaker, a receiver, and the like.

A video processor (not shown) displays various images including video data received from the communication controller 10 and the mobile broadcast processor 20 under the control of the communication controller 10 and the mobile broadcast processor 20.

The memory 40 stores an application program for a processing and controlling operation of the mobile broadcast processor 20, reference data, and various updatable storage data, and is provided as a working memory of the mobile broadcast processor 20.

The mobile broadcast processor 20 decodes a mobile broadcast signal received from the mobile broadcast receiver 30 in a mobile broadcast mode according to key input data received from the communication controller 10. The mobile broadcast processor 20 outputs the decoded video signal to the video processor and the decoded audio signal to the audio processor. The mobile broadcast mode refers to an operation mode in which only mobile broadcast is provided to a user on the mobile broadcast terminal 100.

In accordance with an embodiment of the present invention, if a mobile broadcast-sharing mode is set, the mobile broadcast processor 20 extracts broadcast video data and broadcast audio data from a mobile broadcast signal received from the mobile broadcast receiver 30, and outputs the extracted data to the codec converter 70.

The mobile broadcast-sharing mode refers to a mode in which the mobile broadcast terminal 100 transmits mobile broadcast content to other specific communication terminal through the communication module in order to share received mobile broadcast content with the specific mobile communication terminal. In the mobile broadcast-sharing mode, the mobile broadcast content is transmitted along with call data through a video call set up between the mobile broadcast terminal 100 and the specific communication terminal. That is, users view the same broadcast content simultaneously while performing a video call. Accordingly, a codec of the broadcast video data and the broadcast audio data should be converted into a codec used in a video communication scheme during its transmission, and even in the mobile broadcast terminal 100, the mobile broadcast content is played by the communication module and provided to the user.

The mobile broadcast-sharing mode may be set at a user's request during a voice or video call, or in a mobile broadcast mode, and may also be set in an idle state.

Referring back to FIG. 2, the codec converter 70 converts a codec of received broadcast video data and broadcast audio data into a codec used in video communication, and outputs the conversion results to the audio combiner 80 and the communication controller 10. For example, the codec converter 70 converts a Moving Picture Expert Group 4 (MPEG4), Advanced Video Coding (Advanced Video Coding)/MPEG4, or Bit Sliced Arithmetic Coding (BSAC) audio video/audio codec used in mobile broadcasting into an H.263 codec used in video communication.

The audio combiner 80 combines broadcast audio data received from the codec converter 70 with call audio data received from the audio processor according to predetermined content combination setting, and outputs the combined audio data to the communication controller 10.

Figure 3:
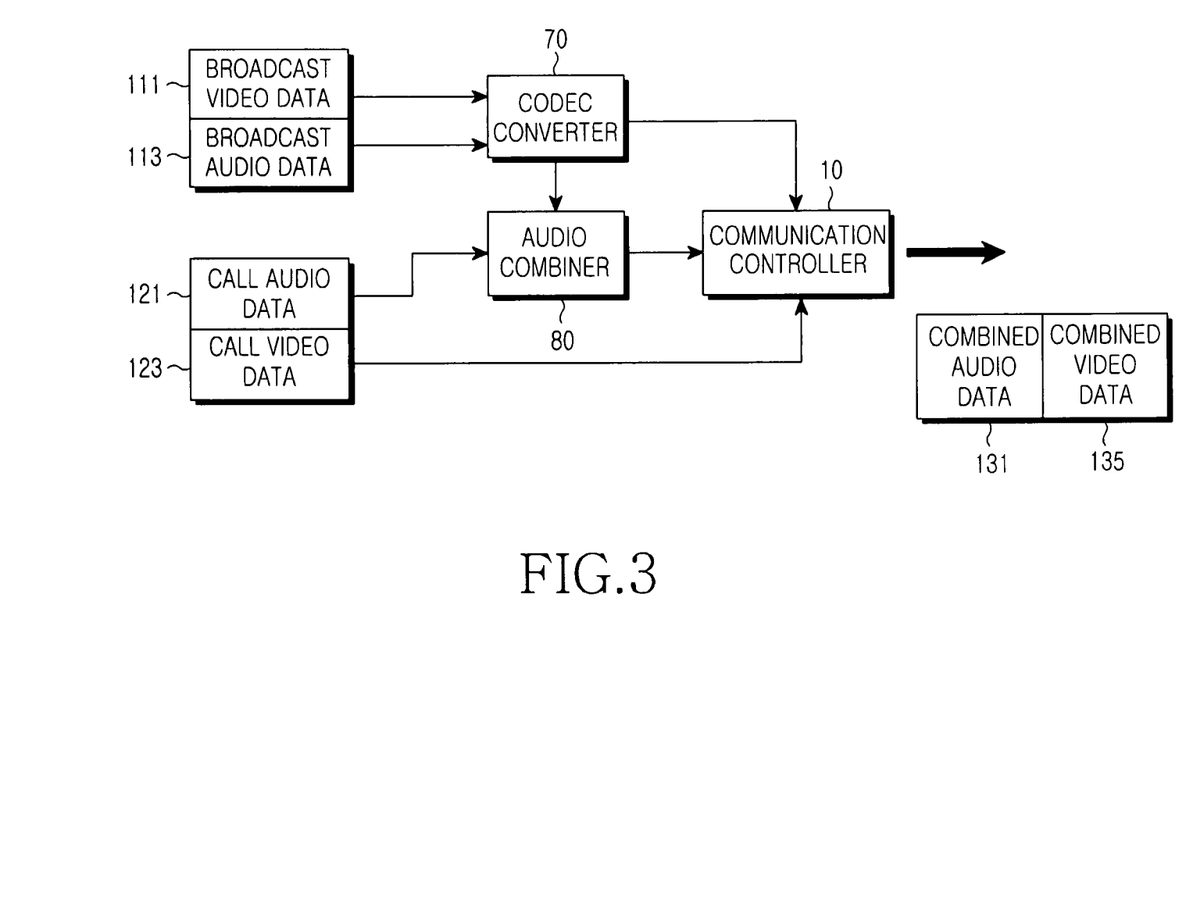
FIG. 3 illustrates a process of generating combined video/audio data according to an embodiment of the present invention.

FIG. 3 shows a process of generating combined audio data and combined video data by the codec converter 70 and the audio combiner 80 according to an embodiment of the present invention.

Referring to FIG. 3, if broadcast video data 111 and broadcast audio data 113 are input to the codec converter 70, then the codec converter 70 converts a codec of the broadcast video data 111 and the broadcast audio data 113 into a codec used in a video communication scheme. The codec converter 70 outputs the broadcast audio data 113 to the audio combiner 80 and the communication controller 10, and outputs the broadcast video data 111 to the communication controller 10.

The audio combiner 80 combines the broadcast audio data 113 received from the codec converter 70 with call audio data 121 received from the audio processor according to predetermined content combination setting. Content combination setting is a combination rule for broadcast audio data, and may be determined by a user or may have any default value.

For example, a combination rule between the broadcast audio data 113 and the call audio data 121 may be set such that priority is set to particular audio data so that only the audio data with the priority is transmitted to the other party's terminal even in the mobile broadcast-sharing mode. Accordingly, the audio combiner 80 outputs only the audio data with set priority to the communication controller 10. If priority is set to the call audio data 121, the audio combiner 80 outputs only the call audio data 121 to the communication controller 10.

The audio combination rule may be set to adjust volumes of two different audio data during audio combination. In this case, the audio combiner 80 adjusts volumes of the received broadcast audio data 113 and call audio data 121 according to content combination setting, combines the volume-adjusted audio data, and outputs the combined audio data to the communication controller 10. After adjusting volumes of respective audio data, it is also possible to output the respective audio data to the communication controller 10 independently, without combining them in one audio data.

As another example, the audio combination rule may be set to transmit only any one of the broadcast audio data 113 and the call audio data 121 depending on the satisfaction/unsatisfaction of specific conditions. That is, if a level of audio received through a receiver or a microphone for call audio is greater than or equal to a certain level, the audio combiner 80 outputs only the call audio data 121 to the communication controller 10, and if the audio level is less than or equal to a certain level, the audio combiner 80 outputs only the broadcast video data 113 to the communication controller 10.

Also, the audio combiner 80 may alternately output the broadcast audio data 113 and the call audio data 121 to the communication controller 10 each time a particular key is input by the user.

The communication controller 10 controls an operation of the mobile broadcast terminal 10 to perform mobile communication. In a communication mode, the communication controller 10 controls the baseband processor 50, the RF unit 60, the audio processor, the video processor, the memory 40, and so forth, to perform audio communication and/or video communication with other terminals.

In accordance with an embodiment of the present invention, under the mobile broadcast-sharing mode, the communication controller 10 provides the broadcast video data 111 and the broadcast audio data 113 received from the codec converter 70 to the user through a display and a speaker. Depending upon playback setting, the broadcast audio data 113 may be muted and the broadcast video data 111 may be simultaneously displayed along with call video data 123 for a video call.

The communication controller 10 generates combined video data 135 including the broadcast video data 111 received from the codec converter 70 and the call video data 123 generated for a video call, and generates combined audio data 131 including the audio data received from the audio combiner 80. The combined video data 135 and the combined audio data 131 include identification information indicating that the combined data is data for broadcast content sharing, and also include synchronization data. The combined audio data 131, as mentioned in the above examples, may be composed of only the broadcast audio data 113 or only the call audio data 121, or may include both of the broadcast audio data 113 and the call audio data 121. The communication controller 10 transmits the combined audio data 131 and the combined video data 135 to the other party's terminal through the baseband processor 50 and the RF unit 60 according to a video communication scheme.

An operation of the above-described mobile broadcast terminal 100 according to an embodiment of the present invention will be described below with reference to FIG. 4.

Figure 4:
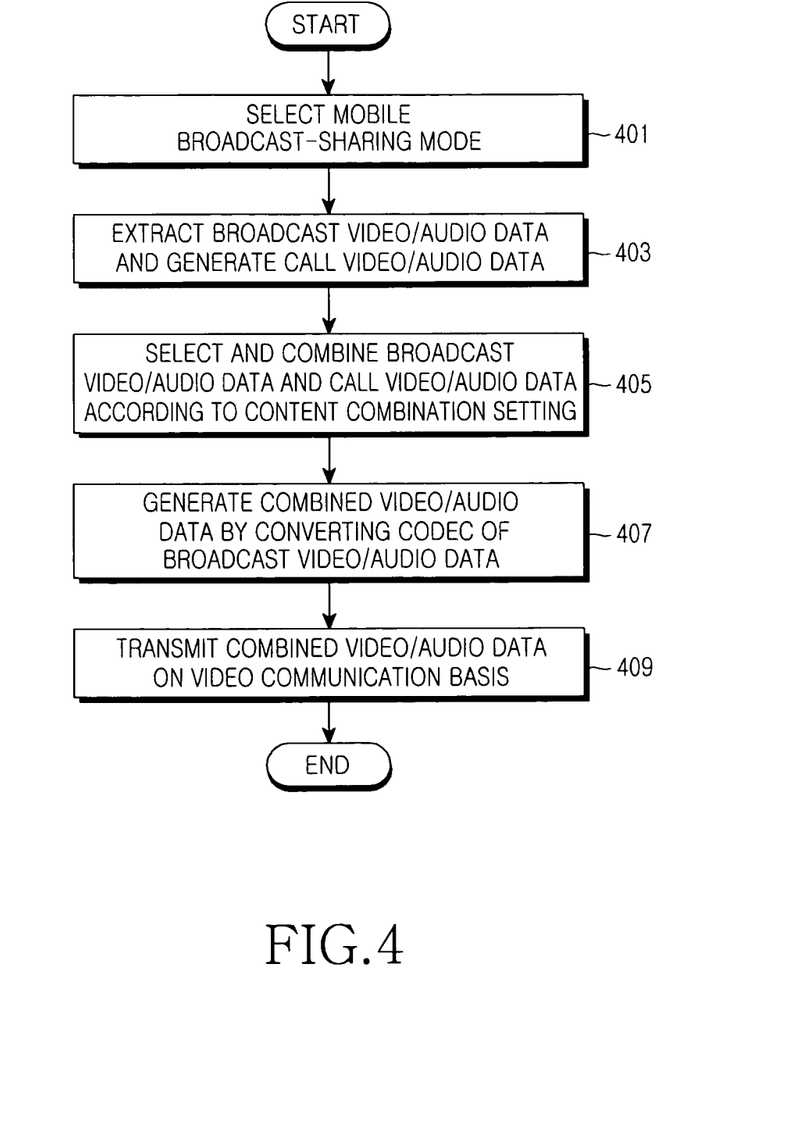
FIG. 4 illustrates an operation of a mobile broadcast terminal according to an embodiment of the present invention.

Referring to FIG. 4, if a mobile broadcast-sharing mode is selected by the user in step 401, the mobile broadcast terminal 100 extracts broadcast video data and broadcast audio data from a mobile broadcast signal being received in step 403. The extracted broadcast content is broadcast content that is received through a channel selected by the user. Further, the mobile broadcast terminal 100 generates call audio data by receiving a voice that is received from the user through a voice receiver, and generates call video data using a camera. Also, the mobile broadcast terminal 100 connects a video call with the other party's terminal.

In step 405, the mobile broadcast terminal 100 selects and combines broadcast video data, broadcast audio data, call video data and call audio data according to content combination setting. In step 407, the mobile broadcast terminal 100 generates combined video data and combined audio data by converting a codec of the broadcast video data and the broadcast audio data. Thereafter, in step 409, the mobile broadcast terminal 100 transmits the combined video data and the combined audio data to the other party's terminal on a video communication basis.

While a codec of the broadcast video data and the broadcast audio data is first converted before combination of the data in the example of FIG. 3, the codec conversion may be achieved after the data combination as in FIG. 4.

Meanwhile, if the mobile broadcast terminal 100 receives combined video data and combined audio data from another terminal through video communication, the mobile broadcast terminal 100 plays the combined video data and the combined audio data according to shared-content play setting. The combined video data and the combined audio data may be distinguished from call video data and call audio data for ordinary video communication based on identification information included in the combined video data and the combined audio data. The shared-content play setting is for setting how to provide the combined video data and the combined audio data received from the other terminal, and it may be changed by the user and may have a default value. For example, the shared-content play setting is to determine a screen ratio of images corresponding to the broadcast video data and the call video data included in the combined video data, and determine whether to display each of the images.

Exemplary screens of the mobile broadcast terminal 100, which are provided during a mobile broadcast-sharing mode according to an embodiment of the present invention, are shown in FIGS. 5A through 5D. The screens shown in FIGS. 5A through 5D indicate display screens of a transmitting-side mobile broadcast terminal that receives mobile broadcast content using a mobile broadcast service and provide the received mobile broadcast content to another terminal.

Referring to FIGS. 5A through 5D, a screen 501 represents a process of setting the mobile broadcast-sharing mode by selecting a menu "Watch TV Together" during a video call, and a screen 503 represents an example in which the mobile broadcast-sharing mode is set during a video call. As shown in the screen 503, three sub screens including video call screens of a sender and a recipient and a mobile broadcast screen may be simultaneously displayed on one screen. In this state, the channel of the mobile broadcast may be changed through a menu.

Figure 5A:
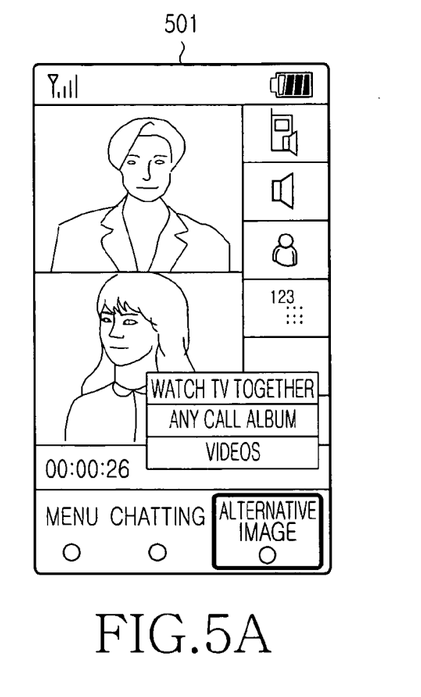
FIGS. 5A through 5D illustrate display screens according to an embodiment of the present invention.
Figure 5B:
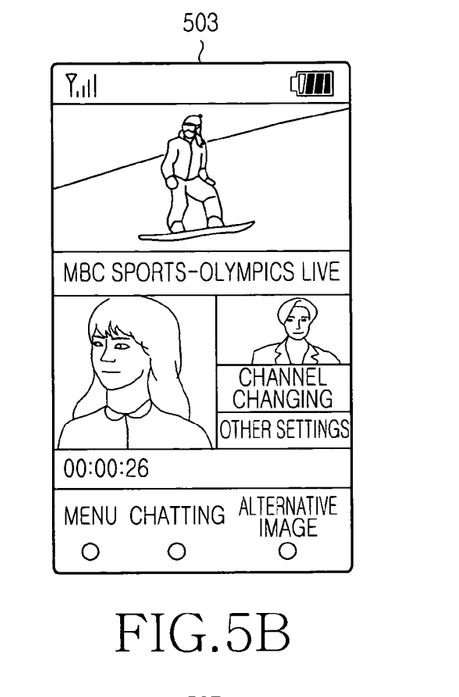
Figure 5C:
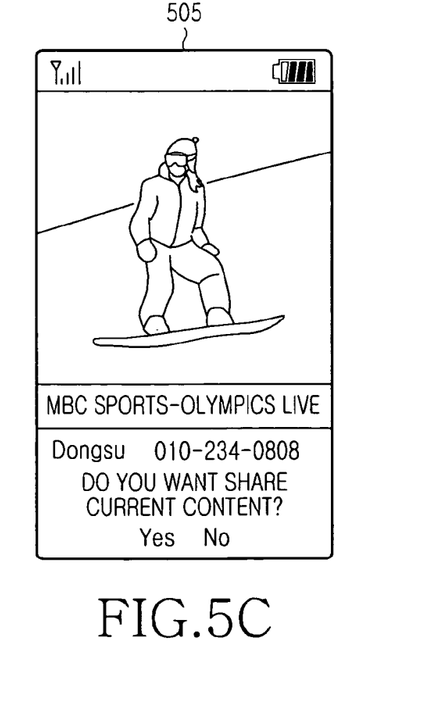

A screen 505 represents an example in which the mobile broadcast-sharing mode is set in a mobile broadcast mode. That is, while viewing mobile broadcast content, the user may select a menu to share the current mobile broadcast content with another mobile terminal.

Figure 5D:
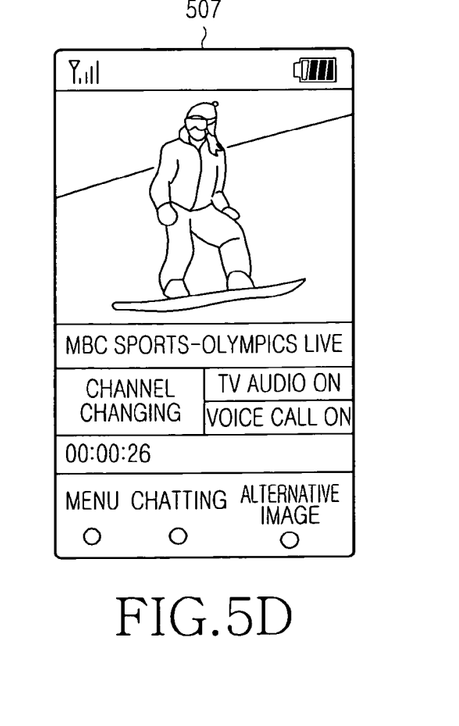

A screen 507 represents an example in which the mobile broadcast terminal performs a voice call while displaying only mobile broadcast content without displaying video call images.

As is apparent from the foregoing description, according to exemplary embodiments of the present invention, it is possible to share mobile broadcast content with the other party using a voice call service. Therefore, even though a user leaves the limited broadcast area of the mobile broadcast service provider, the user may receive a video call-based mobile broadcast roaming service using a roaming service of the video call service. In addition, it is possible to conduct a voice call while sharing mobile broadcast content, thereby improving the user's convenience.

For example, the mobile broadcast terminal may be adapted to share only broadcast audio data when the broadcast content received through a mobile broadcast service includes only the broadcast audio data, or to share any one of the broadcast video data and the broadcast audio data. Also, content combination may be set to transmit any one of the broadcast video data and the call video data to the other party's terminal. In addition, another embodiment of the present invention may be provided to deliver at least one of broadcast video data, broadcast audio data, call video data and call audio data to a receiving-side communication terminal. Besides, the audio combiner 80 may be implemented in the communication controller 10.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for sharing a mobile broadcast service in a mobile broadcast terminal, the method comprising:
   setting a mobile broadcast-sharing mode for sharing a broadcast content by a first terminal during a call between the first terminal and a second terminal; and
   receiving a broadcasting signal comprising broadcasting data and delivering the broadcasting data and call data to the second terminal by the first terminal through video call communication formed between the first terminal and the second terminal.

2. The method of claim 1, the delivering comprising:
   extracting broadcast video data and broadcast audio data from a mobile broadcast signal being received by the first terminal;
   converting a codec of the broadcast video data and the broadcast audio data into a codec used in video communication by the first terminal; and
   delivering at least one of the converted broadcast video data and the converted broadcast audio data by the first terminal through video call communication formed between the first terminal and the second terminal.

3. The method of claim 2, wherein the at least one of the converted broadcast video data and the converted broadcast audio data is delivered to the second terminal along with at least one of call video data and call audio data generated for the video call communication.

4. The method of claim 3, wherein the at least one of the converted broadcast video data and the converted broadcast audio data is played substantially simultaneously along with at least one of call video data and call audio data received from the second terminal through the video call communication.

5. The method of claim 4, wherein the at least one of the converted broadcast video data and the converted broadcast audio data is provided to a user of the first terminal.

6. The method of claim 3, wherein data to be delivered to the second terminal is selected by a user from at least one of the converted broadcast video data, the converted broadcast audio data, the call video data and the call audio data.

7. The method of claim 6, wherein the data selected by the user is transmitted along with identification information indicating that the selected data is data for broadcast content sharing.

8. The method of claim 3, wherein the second terminal plays the at least one of the converted broadcast video data and the converted broadcast audio data and the at least one of the call video data and the call audio data, which are received from the first terminal through the video call communication, according to shared-content play setting.

9. An apparatus capable of sharing a mobile broadcast service, the apparatus comprising:
   a mobile broadcast processor configured to process a mobile broadcast signal and to receive the mobile broadcast signal by a first terminal; and
   a communication module configured to receive a broadcasting signal comprising broadcasting data and deliver the broadcasting data and call data to a second terminal through video call communication during a call between the first terminal and the second terminal.

10. The apparatus of claim 9, further comprising:
    a codec converter configured to convert a codec of a broadcast video data and a broadcast audio data extracted from the mobile broadcast signal by the mobile broadcast processor into a codec used in video call communication, wherein the communication module is configured to deliver at least one of the converted broadcast video data and the converted broadcast audio data received from the codec converter through video call communication.

11. The apparatus of claim 10, wherein the at least one of the converted broadcast video data and the converted broadcast audio data is delivered to the second terminal along with at least one of call video data and call audio data generated for the video call communication.

12. The apparatus of claim 11, wherein the at least one of the converted broadcast video data and the converted broadcast audio data is played substantially simultaneously along with at least one of call video data and call audio data received from the second terminal through the video call communication.

13. The apparatus of claim 12, wherein the at least one of the converted broadcast video data and the converted broadcast audio data is provided to a user of the first terminal.

14. The apparatus of claim 11, wherein data to be delivered to the second terminal is selected by a user from at least one of the converted broadcast video data, the converted broadcast audio data, the call video data and the call audio data.

15. The apparatus of claim 14, wherein the data selected by the user is transmitted along with identification information indicating that the selected data is data for broadcast content sharing.

16. The apparatus of claim 11, wherein the second terminal plays the at least one of the converted broadcast video data and the converted broadcast audio data and the at least one of the call video data and the call audio data, which are received from the first terminal through the video call communication, according to shared-content play setting.

17. A mobile terminal capable of sharing a mobile broadcast service, the mobile terminal comprising:
   a mobile broadcast processor configured to extract broadcast video data and broadcast audio data from a mobile broadcast signal received through a mobile broadcast receiver if a mobile broadcast-sharing mode for sharing a broadcast content with a specific communication terminal is set;
   a codec converter configured to convert a codec of the broadcast video data and the broadcast audio data received from the mobile broadcast processor into a codec used in video communication; and
   a communication module configured to deliver at least one of the converted broadcast video data and the converted broadcast audio data received from the codec converter through video communication formed to the communication terminal.

18. The mobile terminal of claim 17, wherein the at least one of the converted broadcast video data and the converted broadcast audio data is delivered to the communication terminal along with at least one of call video data and call audio data generated for the video communication.

19. The mobile terminal of claim 18, wherein the at least one of the converted broadcast video data and the converted broadcast audio data is played substantially simultaneously along with at least one of call video data and call audio data received from the communication terminal through the video communication.

20. The mobile terminal of claim 19, wherein the at least one of the converted broadcast video data and the converted broadcast audio data is provided to a user of the mobile broadcast terminal.

21. The mobile terminal of claim 18, wherein data to be delivered to the communication terminal is selected by a user from at least one of the converted broadcast video data, the converted broadcast audio data, the call video data and the call audio data.

22. The mobile terminal of claim 21, wherein the data selected by the user is transmitted along with identification information indicating that the selected data is data for broadcast content sharing.

23. The mobile terminal of claim 18, wherein the communication terminal plays the at least one of the converted broadcast video data and the converted broadcast audio data and the at least one of the call video data and the call audio data, which are received from the mobile broadcast terminal through the video communication, according to shared-content play setting.

* * * * *